(12) United States Patent
Kumagai et al.

(10) Patent No.: US 11,458,434 B2
(45) Date of Patent: Oct. 4, 2022

(54) GAS DOWNCOMER PIPE, INSTALLATION MEMBER AND DESULFURIZATION APPARATUS

(71) Applicant: CHIYODA CORPORATION, Yokohama (JP)

(72) Inventors: Kazuya Kumagai, Yokohama (JP); Naobumi Kurosaki, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 16/617,898

(22) PCT Filed: Apr. 24, 2018

(86) PCT No.: PCT/JP2018/016559
§ 371 (c)(1),
(2) Date: Nov. 27, 2019

(87) PCT Pub. No.: WO2018/221079
PCT Pub. Date: Dec. 6, 2018

(65) Prior Publication Data
US 2020/0155998 A1 May 21, 2020

(30) Foreign Application Priority Data
Jun. 1, 2017 (JP) .............................. JP2017-109085

(51) Int. Cl.
*B01D 53/18* (2006.01)
*B01D 53/78* (2006.01)
*B01D 53/50* (2006.01)

(52) U.S. Cl.
CPC ............. *B01D 53/18* (2013.01); *B01D 53/78* (2013.01); *B01D 53/504* (2013.01);
(Continued)

(58) Field of Classification Search
None
See application file for complete search history.

(56) References Cited

U.S. PATENT DOCUMENTS 913,265 A * 2/1909 Coppage ................. F16L 41/14
285/206
1,556,058 A * 10/1925 White ..................... F16L 41/14
285/206
(Continued)

FOREIGN PATENT DOCUMENTS

CN 1075743 C 12/2001
DE 3136529 A1 7/1982
(Continued)

OTHER PUBLICATIONS

Translation of KR101578344B1, accessed Jun. 22, 2021 (Year: 2015).*
(Continued)

*Primary Examiner* — Christopher P Jones
*Assistant Examiner* — Phillip Y Shao
(74) *Attorney, Agent, or Firm* — WHDA, LLP (57) ABSTRACT

There are provided a downcomer pipe that can achieve suppression of accumulation of deposits in use and simplification of operation when being installed into a partition wall, an installation member and a desulfurization apparatus. The downcomer pipe comprises a pipe-shaped member and an installation member for installing the pipe-shaped member into the partition wall. The installation member includes a pipe-shaped part whose inner wall is to be brought into contact with the outer wall of the pipe-shaped member and a protruding part arranged on the outer wall of the pipe-shaped part, the pipe-shaped part and the protruding part constituting an integrated member.

6 Claims, 5 Drawing Sheets

(52) U.S. Cl.
CPC .......... *B01D 2252/103* (2013.01); *B01D 2257/302* (2013.01); *B01D 2257/404* (2013.01); *B01D 2258/0283* (2013.01)

(56) References Cited

U.S. PATENT DOCUMENTS

| | | | | |
|---|---|---|---|---|
| 2,580,818 | A * | 1/1952 | Paula | F16L 41/14 |
| | | | | 285/40 |
| 4,765,960 | A | 8/1988 | Urata et al. | |
| 5,686,053 | A | 11/1997 | Kikkawa et al. | |
| 5,945,081 | A | 8/1999 | Kikkawa et al. | |
| 6,080,370 | A | 6/2000 | Kikkawa et al. | |
| 7,963,567 | B2 * | 6/2011 | Gallardo | F16L 5/08 |
| | | | | 285/140.1 |
| 9,140,011 | B2 * | 9/2015 | Sileno | F16L 5/10 |

FOREIGN PATENT DOCUMENTS

| | | | | |
|---|---|---|---|---|
| JP | 50-17550 | U | 2/1975 | |
| JP | 60-257831 | A | 12/1985 | |
| JP | 5-65980 | A | 3/1993 | |
| JP | 7-71660 | A | 3/1995 | |
| JP | 10-185009 | A | 7/1998 | |
| JP | 2000-279750 | A | 10/2000 | |
| JP | 3187363 | U | 11/2013 | |
| JP | 2016-151341 | A | 8/2016 | |
| KR | 101578344 | B1 * | 12/2015 | C08K 5/00 |

OTHER PUBLICATIONS

Notification of Transmittal of Translation of the International Preliminary Report on Patentability (Forms PCT/IB/326) issued in counterpart International Application No. PCT/JP2018/016559 dated Dec. 12, 2019 with Forms PCT/IB/373, PCT/IB/338 and PCT/ISA/237. (14 pages).
International Search Report dated Jun. 19, 2018, issued in counterpart application No. PCT/JP2018/016559 , w/ English translation (4 pages).
Written Opinion dated Jun. 19, 2018, issued in counterpart application No. PCT/JP2018/016559 (4 pages).
Office Action dated Nov. 10, 2020, issued in counterpart Indian Patent Application No. 201947054387 (w/ English translation, 7 pages).

* cited by examiner

GAS DOWNCOMER PIPE, INSTALLATION MEMBER AND DESULFURIZATION APPARATUS

TECHNICAL FIELD

The present invention relates to a gas downcomer pipe and an installation member used in a desulfurization apparatus, and a desulfurization apparatus.

BACKGROUND ART

There are known conventional structures in various plants such as those of gas absorption equipment that are made to allow gas or liquid to flow among a plurality of spaces, which are formed by dividing a tank by means of a partition wall, by way of through pipes by arranging the through pipes to run through the partition wall. Then, such through pipes may be connected (fastened) to the partition wall by means of welding or the like. However, when the through holes have to be replaced at a predetermined frequency because of degradation or damage, the replacement operation requires a vast period of time and can by turn give rise to damages in the tank main body including the partition wall.

For this reason, Patent Literature 1 discloses a multi-pipe type gas-liquid contact device that comprises pipes running through a deck (partition wall), head sections that are male members to be bonded to the pipes, collar members that are female members for supporting the pipes and bushes for filling the openings and the gaps that the pipes and the deck have.

Additionally, Patent Literatures 2 and 3 disclose a support structure that comprises a support member for supporting pipes, anchor members for anchoring the pipes and elastic members for filling the opening holes and the gaps that the pipes and a partition wall have.

A multi-pipe type gas-liquid contact device according to Patent Literature 1 and a support structure according to Patent Literatures 2 and 3 allow pipes running through a partitions wall to be replaced without giving rise to any damage to a tank main body.

CITATION LIST

Patent Literature

PTL 1: Japanese Patent Application Laid-Open No. S60-257831
PTL 2: Japanese Patent Application Laid-Open No. H05-065980
PTL 3: Japanese Patent Application Laid-Open No. H07-071660

SUMMARY OF INVENTION

Technical Problem

However, a multi-pipe type gas-liquid contact device according to Patent Literature 1 requires at least two components including head sections to be bonded to pipes and collar sections for supporting pipes and hence a number of operating steps for installing pipes into a partition wall and, therefore, a reduced operating time has been required to it. Additionally, since the head sections and the collar sections show a complicated profile, there have been instances where deposits firmly adhere to recesses and gaps.

Still additionally, a support structure according to Patent Literatures 2 and 3 also requires at least two components including support members for supporting pipes and anchor members for anchoring pipes and hence is accompanied by problems similar to those of a multi-pipe type gas-liquid contact device according to Patent Literature 1.

Therefore, the object of the present invention is to provide a gas downcomer pipe, an installation member and a desulfurization apparatus that can suppress any accumulation of deposits in use and achieve simplification of operations involved in installation into a partition walls.

Solution to Problem

A gas downcomer pipe in a mode of carrying out the present invention is a downcomer pipe to be installed into a partition wall for dividing the space in the inside of a desulfurization apparatus for desulfurizing gas containing sulfur oxides by bringing such gas into contact with absorber liquid so as to run through the partition wall, the gas downcomer pipe comprising a pipe-shaped member and an installation member for installing the pipe-shaped member into the partition wall, the installation member including a pipe-shaped part whose inner wall is to be brought into contact with the outer wall of the pipe-shaped member and a protruding part arranged on the outer wall of the pipe-shaped part, the pipe-shaped part and the protruding part constituting an integrated member.

An installation member in another mode of carrying out the present invention is an installation member for installing a pipe-shaped member to be arranged so as to run through a partition wall for dividing the space in the inside of a desulfurization apparatus for desulfurizing gas containing sulfur oxides by bringing such gas into contact with absorber liquid into the partition wall, the installation member comprising a pipe-shaped part whose inner wall is to be brought into contact with the outer wall of the pipe-shaped member and a protruding part arranged on the outer wall of the pipe-shaped part, the pipe-shaped part and the protruding part constituting an integrated member.

A desulfurization apparatus in still another mode of carrying out the present invention is a desulfurization apparatus comprising a gas introducing channel for introducing gas containing sulfur oxides, a gas introducing chamber into which gas containing sulfur oxides is to be introduced, an absorber liquid chamber arranged under the gas introducing chamber in a lower part of which absorber liquid is to be contained, a partition wall for separating the gas introducing chamber and the absorber liquid chamber and a gas downcomer pipe for feeding the gas introduced into the gas introducing chamber into the absorber liquid contained in the absorber liquid chamber, the gas downcomer pipe being installed into the partition wall so as to run through the partition wall, the gas downcomer pipe including a pipe-shaped member and an installation member for installing the pipe-shaped member into the partition wall, the installation member including a pipe-shaped part whose inner wall is to be brought into contact with the outer wall of the pipe-shaped member and a protruding part arranged on the outer wall of the pipe-shaped part, the pipe-shaped part and the protruding part constituting an integrated member.

Advantageous Effects of Invention

Thus, according to the present invention, there are provided a gas downcomer pipe, an installation member and a desulfurization apparatus that can suppress any accumulation of deposits in use and achieve simplification of operations involved in installation into a partition wall.

DESCRIPTION OF EMBODIMENTS

Now, a gas downcomer pipe, an installation member and a desulfurization apparatus according to the present invention will be described in detail by referring to the drawings.

While the ones, which will be described hereinafter and are in respective modes of carrying out the present invention, are subject to various technically preferable limitations because they are respectively in preferable modes of carrying out the present invention, the scope of the present invention is by no means limited to those modes unless described specifically to limit the present invention in the following description.

[Gas Downcomer Pipe, Installation Member]

Firstly, a gas downcomer pipe in a mode of carrying out the present invention will be described by referring to FIG. 1 and FIG. 2.

Figure 1:
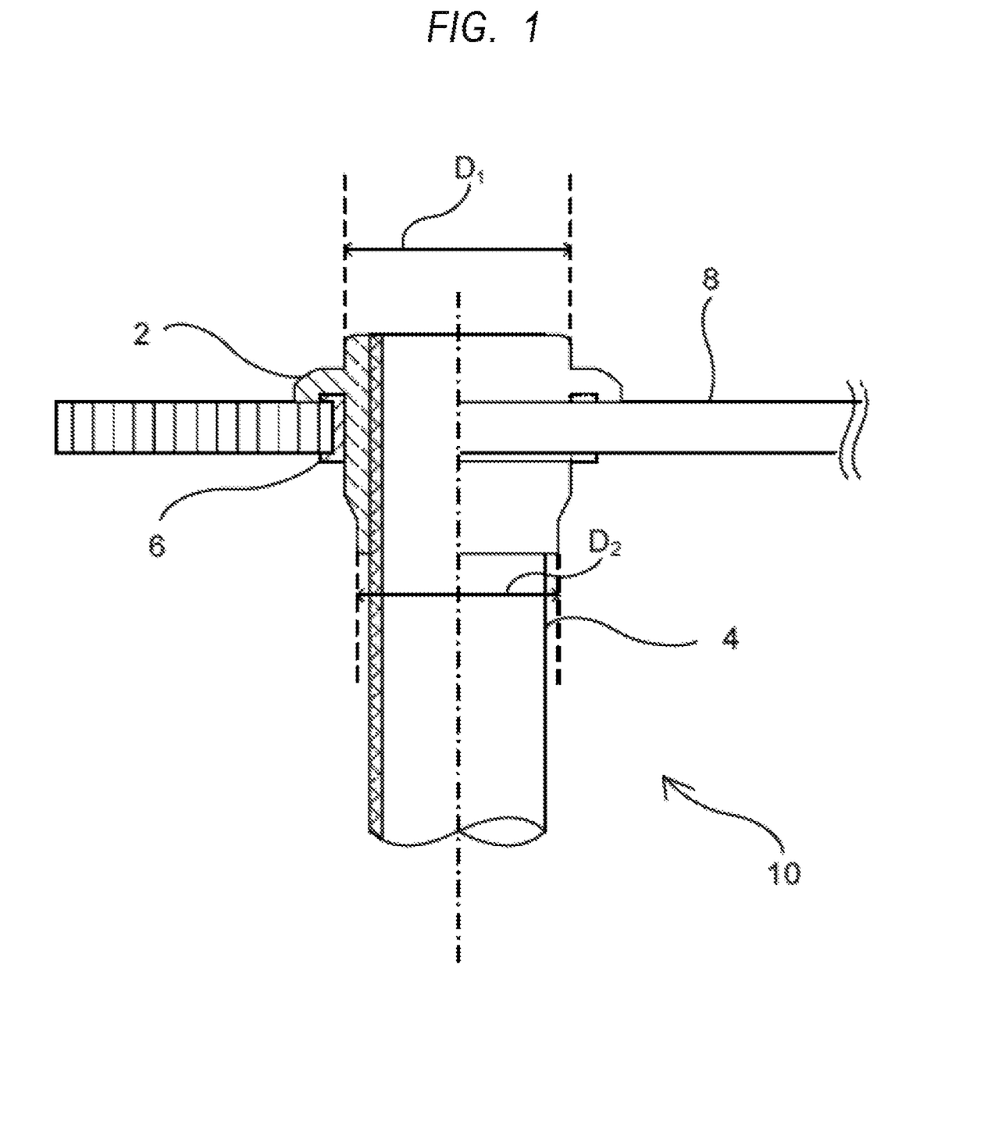
FIG. 1 is a schematic cross-sectional view of an exemplar gas downcomer pipe, which is in a mode of carrying out the present invention, and its periphery, showing the configuration thereof.
Figure 2:
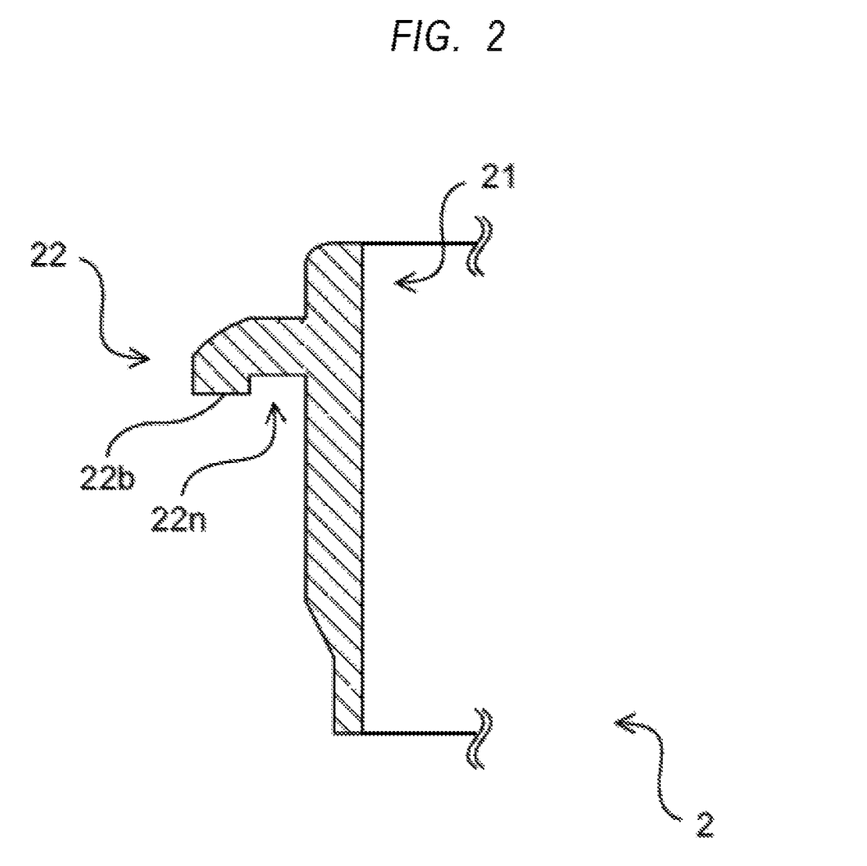
FIG. 2 is an enlarged schematic view of the part of the installation member in FIG. 1.

FIG. 1 is a schematic cross-sectional view of an exemplar gas downcomer pipe, which is in a mode of carrying out the present invention, and its periphery, showing the configuration thereof, and FIG. 2 is an enlarged schematic view of the part of the installation member in FIG. 1.

The gas downcomer pipe 10 comprises a pipe-shaped member 4 and an installation member 2 for installing the pipe-shaped member 4 into a partition wall 8. The outer wall of the pipe-shaped member 4 and the installation member 2 (the inner wall of a pipe-shaped part 21) can be bonded to each other by known means, for example, by means of an adhesive agent.

As shown in FIG. 1, the gas downcomer pipe 10 runs through the partition wall 8 and is installed in such a state that an upper part thereof projects from the upper surface of the partition wall 8. Both the upper surface and the lower surface of the partition wall 8 extend in horizontal directions, while the pipe axis of the gas downcomer pipe 10 extends in the vertical direction.

The gas downcomer pipe 10 runs through an opening (not shown) of the partition wall 8 and the outer wall of the gas downcomer pipe 10 and the inner wall of the opening of the partition wall 8 are airtightly connected to each other by way of an elastic member 6. The elastic member 6 will be described in detail hereinafter.

The pipe-shaped member 4 is a pipe-shaped (hollow and cylindrical) member whose pipe axis extends in the vertical direction and which runs through the opening of the partition wall 8. Therefore, the pipe-shaped member 4 performs a function of putting the two spaces separated by the partition wall 8 into communication with each other. More specifically, the pipe-shaped member 4 in this mode of carrying out the invention performs a function of operating as a supply channel for allowing gas to run in the inside thereof and feeding gas from upward to downward.

The installation member 2 comprises a pipe-shaped part 21 whose inner wall contacts the outer wall of the pipe-shaped member 4 and a protruding part 22 arranged on the outer wall of the pipe-shaped part 21. The pipe-shaped part 21 and the protruding part 22 constitute an integrated member.

Note that an integrated member may be a member produced by integrating a plurality of members by means of an adhesive agent or the like in advance or a member prepared from the beginning as a single member without passing through any integrating process that involves bonding or the like. In other words, the installation member 2 is required only to be an integrated member at the time of installation into the partition wall 8 and may be formed by a plurality of members that have been integrated in advance prior to the operation of installation or by a single member.

It is particularly preferable that the installation member 2 is a single member because, when it is a single member, it can achieve cost reduction and simplification of manufacturing steps by way of reduction of the number of parts and omission of steps such as bonding steps if compared with an integrated member prepared by integrating a plurality of members in advance and prior to the operation of installation. To the contrary, for example, in the instance of a multi-pipe type gas-liquid contact device according to Patent Literature 1 or a support structure according to Patent Literatures 2 and 3 where a plurality of members are manufactured to raise the manufacturing cost and additionally an operation of integrating a plurality of members is required at the time of installation to increase the time of the operation of installation.

The installation member 2 comprising the pipe-shaped part 21 and the protruding part 22 can be prepared by way of a known manufacturing method.

When the installation member 2 is to be prepared as a single member, for example, it may be molded by means of an injection mold or cutout by cutting, either of the above techniques may appropriately be selected according to the material of the installation member 2. Above all, the installation member 2, which is a single member, is preferably is a molded product prepared by means of an injection mold, from the viewpoint of productivity and yield.

When, on the other hand, the installation member 2 is to be prepared by integrating a plurality of members, a method similar to the one that can be used to prepare a single member can also be employed. The method to be used to integrate the obtained individual members is not subject to any particular limitations so long as they can be airtightly integrated and hence a known method can be used to integrate them. For example, a method of bonding them by means of an adhesive agent or a method of binding them together by means of welding may be employed.

The protruding part 22 projects in directions perpendicular relative to the pipe axis of the pipe-shaped part 21 (and hence in horizontal directions) and its bottom surface 22b includes a cutout section 22n. The cutout section 22n is a part of the bottom surface 22b of the protruding part 22 that is arranged along the outer wall-side end of the pipe-shaped part 21 and refers to a vertically and upwardly recessed part of the bottom surface 22b.

The profile of the cutout section 22n is substantially the same as the profile of an upper end part of the elastic member 6 when the gas downcomer pipe 10 is installed into the partition wall 8 and the cutout section 22n and the upper end part of the elastic member 6 become engaged with each other. Therefore, when the gas downcomer pipe 10 is installed into the partition wall 8, the bottom surface 22b of the protruding part 22 except the region thereof where the cutout section 22n is not arranged contacts the upper surface of the partition wall 8, whereas the region of the bottom surface 22b where the cutout section 22n is arranged contacts the upper end part of the elastic member 6. As the bottom surface 22b of the protruding part 22 contacts the upper surface of the partition wall 8, the gas downcomer pipe 10 that comprises the installation member 2 can accurately be placed in position.

The pipe-shaped part 21 has a hollow cylindrical profile. The outer diameter of the lower end of the pipe-shaped part 21 is smaller than the outer diameter of the pipe-shaped part 21 at the position same as the position of the bottom surface 22b of the protruding part 22 in the axial direction of the pipe-shaped part 21. In other words, when the gas downcomer pipe 10 is installed and if compared with the outer diameter thereof at the position where the pipe-shaped part 21 contacts the partition wall 8 by way of the elastic member 6, the outer diameter of the lower end of the pipe-shaped part 21 is so designed as to be smaller. With such an arrangement, the gas downcomer pipe 10 can be inserted into the opening of the partition wall 8 with ease.

When the gas downcomer pipe 10 is made to run through the opening of the partition wall 8 and installed, the pipe-shaped member 4 is inserted into the opening from its lower end, then its lower end position is made to pass through the opening and finally the position of the pipe-shaped part 21 where the part 21 is to be brought into contact with the partition wall 8 gets to the opening. Therefore, the gas downcomer pipe 10 can easily be inserted into the opening of the partition wall 8 without reducing the contact pressure with the partition wall 8 (elastic member 6) at the time of installation by reducing the outer diameter of the lower end of the pipe-shaped part 21.

Note that the inner diameter of the pipe-shaped part 21 is preferably constant. Therefore, the outer diameter of the pipe-shaped part 21 is preferably adjusted by increasing and decreasing the wall thickness of the pipe-shaped part 21. More specifically, as shown in FIG. 2, the pipe-shaped part 21 is made to have a small wall thickness at the lower end thereof and a large wall thickness at the position where it contacts the partition wall 8 by way of the elastic member 6.

While the material of the installation member 2 is not subject to any particular limitations, exemplar materials include synthetic resin such as polyvinyl chloride.

Similarly, while the material of the pipe-shaped member 4 is not subject to any particular limitations, exemplar materials include synthetic resin such as polyvinyl chloride. The material of the installation member 2 and the material of the pipe-shaped member 4 are preferably same.

The elastic member 6 has an annular shape and arranged between the outer wall of the gas downcomer pipe 10 (installation member 2) and the inner wall of the opening of the partition wall 8. Since the elastic member 6 fills the gap between the gas downcomer pipe 10 and the partition wall 8, they can be airtightly brought into contact with each other. The contact surface of the elastic member 6 relative to the installation member 2 or the contact surface thereof relative to the opening of the partition wall 8 may be provided with an annular protrusion to improve the sealing performance.

As shown in FIG. 1, the elastic member 6 is arranged at the contact position of the gas downcomer pipe 10 and the partition wall 8 so as to project from both the upper surface and the lower surface of partition wall 8. Due to the projecting portions at the upper and lower surfaces, the gas downcomer pipe 10 would hardly fall down from the partition wall 8 even if downwardly or upwardly directed force is exerted to the elastic member 6 when the gas downcomer pipe 10 is installed or uninstalled.

While the material of the elastic member 6 is not subject to any particular limitations, exemplar materials include rubber materials such as butyl rubber, silicon rubber and fluorine rubber. It is particularly preferable to adjust the hardness of the rubber material to obtain an elastic material having a desired degree of hardness so as to make it hard to such an extent that it can prevent itself from falling down and also soft to such an extent that it can airtightly adhere.

Now, the dimensions of the gas downcomer pipe in this mode of carrying out the present invention and those of the gas to be processed introducing chamber, which will be described hereinafter, will additionally be described.

The gas downcomer pipe 10 has an outer diameter $D_1$ of 100-200 mm in the region of contact with the partition wall 8 and an outer diameter $D_2$ of 90-190 mm at the lower end. The difference between the outer diameter $D_1$ and the outer diameter $D_2$ ($D_1-D_2$) of the gas downcomer pipe 10 is 5-20 mm, preferably 6-10 mm. When the difference ($D_1-D_2$) is 5-20 mm, prevention of falling down of the elastic member 6 at the time of insertion of the gas downcomer pipe 10 and excellent tight contact between the gas downcomer pipe 10 and the elastic member 6 can easily be realized and hence the installing operation can more easily be executed.

Note that the length of the gas downcomer pipe 10 is 1,200-4,700 mm.

Figure 5:
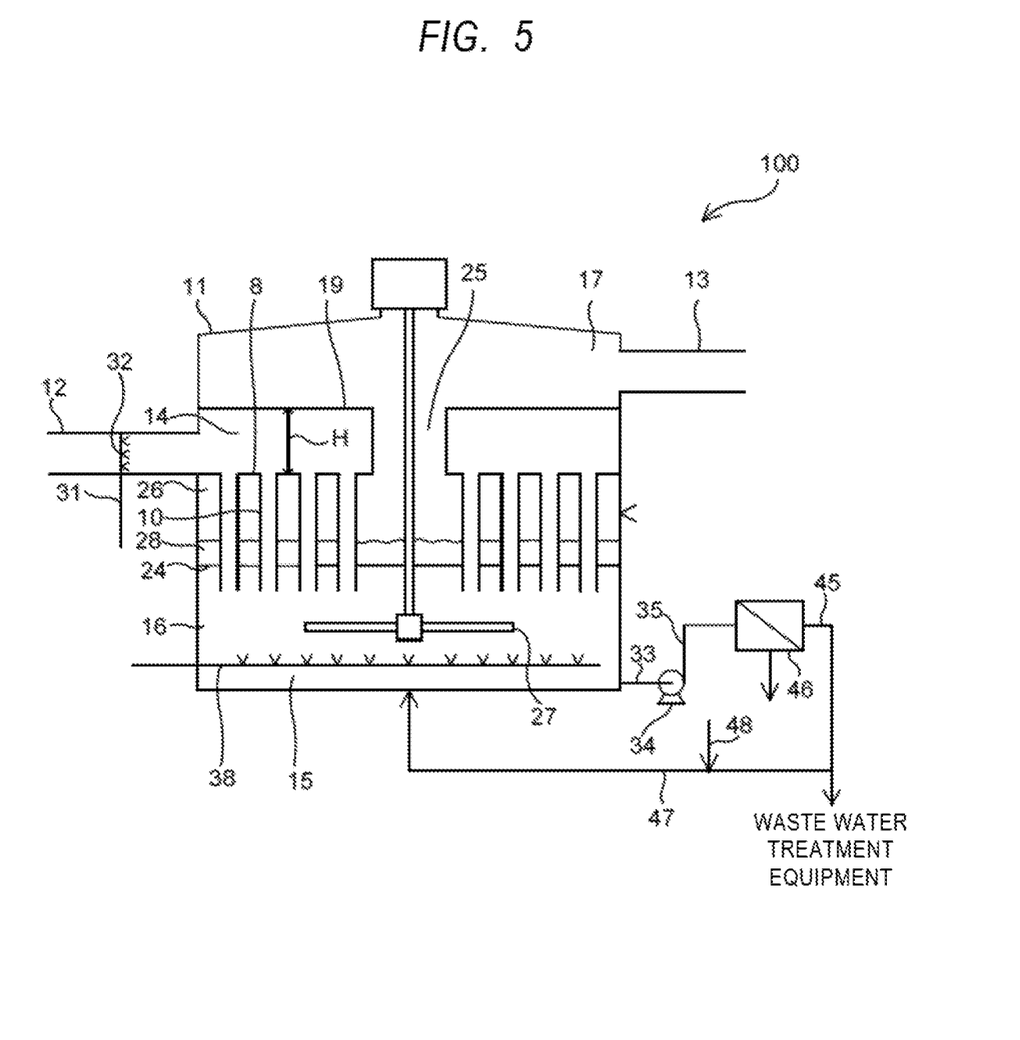
FIG. 5 is a schematic illustration of an exemplar jet bubbling type desulfurization apparatus, which is in a mode of carrying out the present invention.

On the other hand, the height H of the gas to be processed introducing chamber 14, which will be described hereinafter, is 1,500-5,000 mm. Additionally, the diameter of the opening that the partition wall 8 is provided with is 110-210 mm. The difference between the outer diameter $D_1$ of the gas downcomer pipe 10 and the diameter of the opening that the partition wall 8 is provided with is 5-20 mm, preferably 6-10 mm.

The difference between the outer diameter $D_1$ of the gas downcomer pipe 10 and the diameter of the opening that the partition wall 8 is provided with means the thickness (at the time of completion of installation and at the time of being compressed) of the elastic member 6 at the site thereof where it contacts the peripheral wall of the opening. When the thickness is within the above-described range, the gas downcomer pipe 10 can stably be provided.

(Installation Method)

With a specific installation method, for instance, installation of the gas downcomer pipe 10 can be realized by following steps (1)-(3) described below.

(1) First, the annular elastic member 6 is installed into the opening of the partition wall 8.
(2) Then, the lower end of the gas downcomer pipe 10 is inserted into the opening of the partition wall 8, into which the annular elastic member 6 has been installed. Note that the installation member 2 and the pipe-shaped member 4 are to be bonded to each other in advance before inserting the gas diameter pipe 10.
(3) Subsequently, the gas downcomer pipe 10 is pushed in until the bottom surface 22b of the protruding part 22 of the installation member 2 contacts the upper surface of the partition wall 8, when the installation is finished.

A lubricating agent such as a synthetic detergent is preferably applied in advance to the gas downcomer pipe 10 to be inserted into the opening of the partition wall 8 in above-described (2) in order to facilitate the insertion. Preferably, the lubricating agent is applied to a front end part of the gas downcomer pipe 10 (the end part opposite to the side of the installation member 2) and to a rear end part (the region to be hidden by the installation member 2 and the protruding part 22).

With the gas downcomer pipe and the installation member in the above-described mode of carrying out the present invention, since the configuration of the installation member 2 is simple, any accumulation of deposits could be suppressed. Additionally, since the gas downcomer pipe 10, at which the installation member 2 and the pipe-shaped member 4 are bonded to each other, can be installed simply by inserting it into the opening of the partition wall 8, into which the elastic member 6 has been installed, the operation could be simplified to a large extent. Furthermore, since the pipe-shaped part 21 and the protruding part 22 constitute a single member and hence require neither time for manufacturing a plurality of members nor time for bonding them in this mode, the manufacturing time could be curtailed and the manufacturing cost could be reduced.

MODIFIED EXAMPLE

Now, a modified example of the gas downcomer pipe in this mode of carrying out the present invention will be described by referring to FIG. 3 and FIG. 4.

Figure 3:
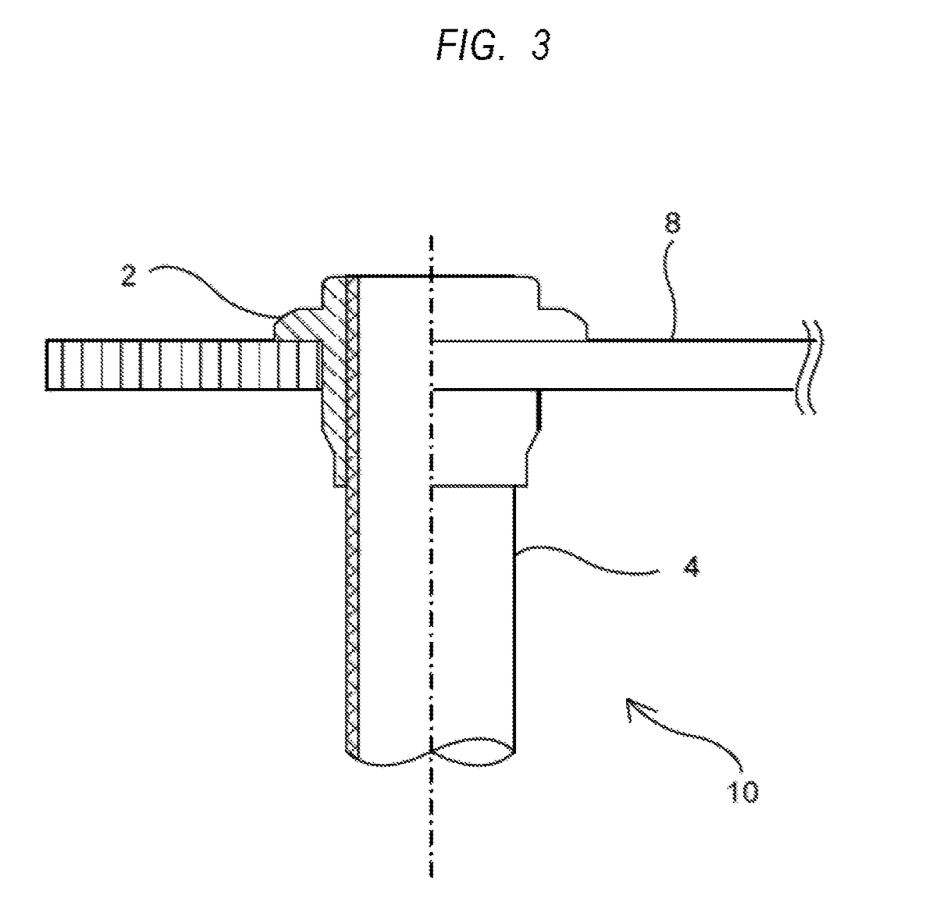
FIG. 3 is a schematic cross-sectional view of a modified example of the gas downcomer pipe, which is in a mode of carrying out the present invention, and its periphery, showing the configuration thereof.
Figure 4:
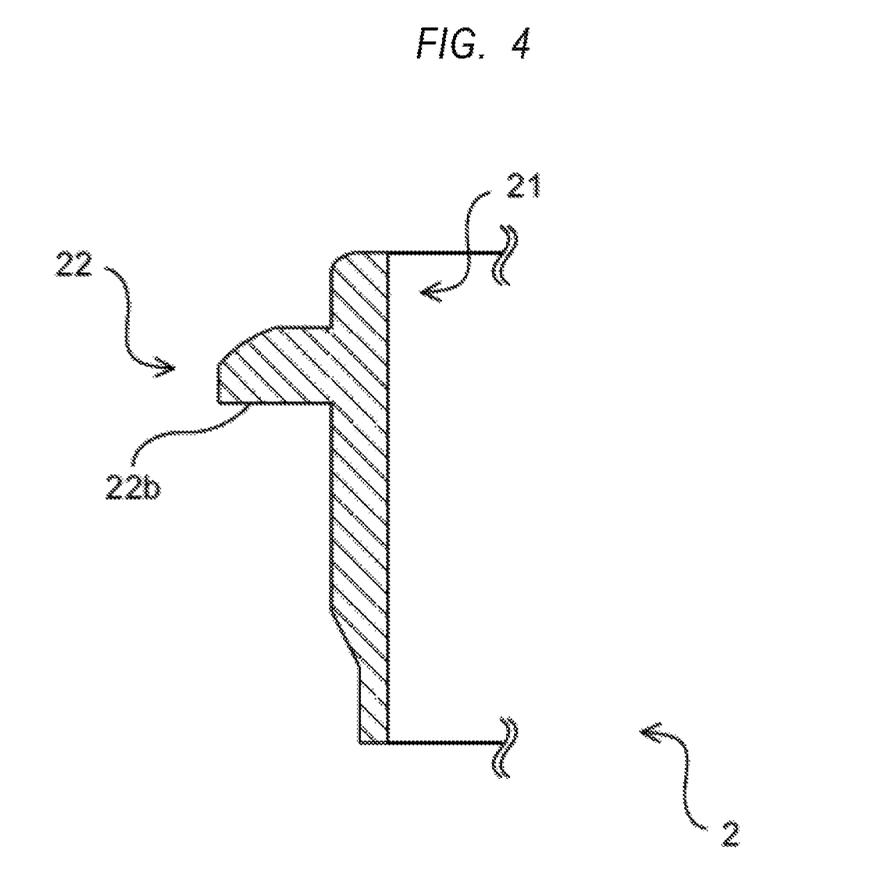
FIG. 4 is an enlarged schematic view of the part of the installation member in FIG. 3.

FIG. 3 is a schematic cross-sectional view of a modified example of the gas downcomer pipe, which is in a mode of carrying out the present invention and its periphery, showing the configuration thereof and FIG. 4 is an enlarged schematic partial view of the installation member in FIG. 3.

Note that only the differences from the configuration shown in FIG. 1 and FIG. 2 will be described below and description of the parts of the configuration that are the same as those of FIG. 1 and FIG. 2 will be omitted.

With the modified example shown in FIG. 3 and FIG. 4, the bottom surface 22b of the protruding part 22 shows a flat profile and is not provided with the cutout section 22n shown in FIG. 1 and FIG. 2. Additionally, no elastic member 6 shown in FIG. 1 is provided.

Therefore, the outer wall of the gas downcomer pipe 10 directly contacts the inner wall of the opening of the partition wall 8. Additionally, the bottom surface 22b of the protruding part 22 contacts the upper surface of the partition wall 8 over the entire area thereof.

As for the material of the installation member 2 of this modified example, it is preferably a material having elasticity. In this modified example, the installation member 2 is made to secure the elasticity feature instead of providing an elastic member in order to realize an airtight contact between the installation member 2 (gas downcomer pipe 10) and the partition wall 8. In other words, the installation member 2 of this modified example is a member having both the functional feature of the installation member 2 and the functional feature of the elastic member 6 shown in FIG. 1 and FIG. 2.

Except the above points, this modified example is identical with the gas downcomer pipe in the mode shown in FIG. 1 and FIG. 2.

With this modified example, the number of components is further reduced and hence the operation time for the installation can be more curtailed.

[Desulfurization Apparatus]

Now, a jet bubbling type desulfurization apparatus in a mode of carrying out the present invention will be described by referring to FIG. 5.

FIG. 5 is a schematic illustration of an exemplar jet bubbling type desulfurization apparatus, which is in a mode of carrying out the present invention. The jet bubbling type is a type with which gas containing sulfur oxides and oxygen are introduced into the absorber liquid (an alkali agent-containing solution) contained in a lower part of a reaction tank and the gas and the absorber liquid are brought into contact and made to react with each other, while forming a froth layer, in order to eliminate sulfur oxides.

Examples of sulfur oxides ($SO_x$) include sulfur dioxide in various forms such as sulfurous acid gas and aqueous solution of sulfurous acid gas. Additionally, gas containing sulfur oxides (to be referred to as gas to be processed hereinafter) include combustion exhaust gas discharged from coal burning furnaces and coal burning thermal power plants.

As shown in FIG. 5, a jet bubbling type desulfurization apparatus 100 comprises a jet bubbling type reaction tank 11. Note that, while the reaction tank 11 in this mode is cylindrical, the reaction tank 11 is not limited to cylindrical and may be made to show any shape such as box shape (rectangular parallelepiped shape).

The reaction tank 11 includes a gas to be processed introducing chamber 14, an absorber liquid chamber 16 and a processed gas discharging chamber 17. Additionally, the reaction tank 11 is provided with a gas to be processed introducing channel 12 and a processed gas discharging port 13.

The gas to be processed introducing channel 12 is arranged at or near the center part of the lateral wall of the reaction tank 11 so as to project therefrom and introduce gas to be processed into the gas to be processed introducing chamber 14.

The gas to be processed introducing chamber 14 is arranged in the inside of the reaction tank 11 at the center part in the vertical direction and gas to be processed that contains sulfur oxides is introduced into it from the gas to be processed introducing channel 12.

The absorber liquid chamber 16 is arranged at the lower side of the gas to be processed introducing chamber 14 and so configured as to be able to contain absorber liquid 15 in a lower part thereof.

The processed gas discharging chamber 17 is arranged at the upper side of the gas to be processed introducing chamber 14 and communicates with the processed gas discharging port 13.

The processed gas discharging port 13 is arranged at an upper part of the lateral wall of the reaction tank 11 so as to project therefrom and discharges the processed gas processed for desulfurization in the absorber liquid chamber 16 from the processed gas discharging chamber 17.

The gas to be processed introducing chamber 14 and the absorber liquid chamber 16 are separated from each other by the partition wall 8 that transversally crosses the inside of the reaction tank 11. Additionally, the gas to be processed introducing chamber 14 and the processed gas discharging chamber 17 are separated from each other by the floor plate 19 of the processed gas discharging chamber 17 that transversally crosses the inside of the reaction tank 11.

Thus, the space in the inside of the reaction tank 17 shown in FIG. 5 is divided into the gas to be processed introducing chamber 14 and the absorber liquid chamber 15 by the partition wall 8 and also into the gas to be processed introducing chamber 14 and the processed gas discharging chamber 17 by the floor plate 19.

The partition wall 8 also operates as the bottom surface of the gas to be processed introducing chamber 14. At the partition wall 8, a plurality of gas downcomer pipes 10 that extend downward to get to below the liquid surface 24 of the absorber liquid 15 are arranged so as to run through the partition wall 8. The gas downcomer pipes 10 are the same as the gas downcomer pipe in a mode of carrying out the present invention as described above and installed into the partition wall 8 by means of an installation member 2. The above-described elastic member 6 is omitted from the illustration.

The gas downcomer pipes 10 operate to make the gas to be processed introducing chamber 14 and the absorber liquid chamber 16 communicate with each other. Therefore, the gas to be processed that is introduced into the gas to be processed introducing chamber 14 is then fed into the absorber liquid 15 contained in the absorber liquid chamber 16 by way of the plurality of gas downcomer pipes 10. The gas downcomer pipes 10 are provided at a lower side thereof with a plurality of small openings and the gas to be processed that is jetted out from the openings of the gas downcomer pipes 10 is dispersed into the absorber liquid 15. The gas to be processed that is dispersed into the absorber liquid 15 is thereafter made to go up in the absorber liquid 15 to the liquid surface 24 and subsequently forms a froth layer 28.

The floor plate 19 also operates as a partition wall for separating the gas to be processed introducing chamber 14 and the processed gas discharging chamber 17. Note, however, that the floor plate 19 has neither gas downcomer pipes nor installation members and hence differs from the above-described partition wall that is the object where gas downcomer pipes in a mode of carrying out the present invention are installed.

The floor plate 19 is provided with a communication pipe 25 that extends downward and runs through a center part in horizontal directions of the gas to be processed introducing chamber 14 until it gets to the absorber liquid chamber 16 and the communication pipe 25 holds the absorber liquid chamber 16 and the processed gas discharging chamber 17 in communication with each other. Thus, the processed gas that has been desulfurized in the inside of the absorber liquid chamber 16 gets to the processed gas discharging chamber 17 from the space section 26 that is a space located above the liquid surface 24 in the absorber liquid chamber 16 by way of the communication pipe 25 and then is discharged from the processed gas discharging port 13.

Note, however, that it may be so configured that the processed gas discharging chamber 17 and the communication pipe 25 are omitted and the processed gas discharging port 13 is so arranged as to communicate with the space section 26 such that the space section 26 also operates as the processed gas discharging chamber 17 shown in FIG. 5.

An industrial water supply pipe 32 that sprays out industrial water coming by way of piping 31 into the gas to be processed is arranged in the gas to be processed introducing channel 12. Industrial water is employed as humidifying liquid for humidifying gas to be processed and hence humidifies and cools gas to be processed. Humidifying liquid that is to be sprayed out in the inside of the gas to be processed introducing channel 12 is not limited to industrial water and hence not subject to any particular limitations so long as it is liquid such as water that can humidify gas to be processed. Note that the piping 31 and the industrial water supply pipe 32 may not necessarily be arranged. Furthermore, a member for supplying humidifying liquid other than the industrial water supply pipe 32 may be arranged in the inside of the gas to be processed introducing channel 12 and in the inside of the gas to be processed introducing chamber 14.

An agitator 27 for agitating the absorber liquid 15 is arranged at the reaction tank 11. The agitator 27 rotates at a predetermined rotational speed and agitates the absorber liquid 15 contained in the absorber liquid chamber 16.

One of the ends of an oxygen supply pipe 38 is laid from the bottom to near the center of the absorber liquid chamber 16 of the reaction tank 11. The other end of the oxygen supply pipe 38 is connected to an oxygen supply source (not shown) at the outside of the reaction tank 11. Then, oxygen is supplied into the absorber liquid 15 contained in the absorber liquid chamber 16 by way of the oxygen supply pipe 38.

The oxygen supplied into the absorber liquid 15 reacts with the alkali agent and the sulfur oxides dissolved in the absorber liquid 15. Part of the product produced by the reaction of the oxygen, the alkali agent and the sulfur oxides precipitates in the absorber liquid 15 to become a precipitate.

Note that, while the oxygen supply pipe 38 only has to supply liquid and/or gas that contains oxygen from the oxygen supply source into the absorber liquid 15, it preferably supplies air from the viewpoint of economy.

Piping 33 that is connected to a pump 34 is arranged at the bottom of the lateral wall of the absorber liquid chamber 16 that contains absorber liquid including the precipitate in the inside. The pump 34 extracts the slurry that includes the precipitate and the absorber liquid from the inside of the absorber liquid chamber 16 by way of the piping 33. One of the ends of piping 35 is connected to the outlet side of the pump 34 and the other end of the piping 35 is connected to a solid-liquid separator 46. Thus, the slurry extracted from the absorber liquid chamber 16 is fed to the solid-liquid separator 46 by way of the piping 33, the pump 34 and the piping 35.

The solid-liquid separator 46 separates the solid and the liquid of the mixture extracted from the inside of a mixing tank 36 and collects the separated solid component.

Waste water treatment equipment is connected to a rear part of the solid-liquid separator 46. The collection residue liquid left after the collection of the solid component by the solid-liquid separator 46 is supplied to the waste water treatment equipment by way of piping 45 connected to the solid-liquid separator 46. The waste water treatment equipment removes nitrogen compounds, COD (chemical oxygen demand) components and so on from the collection residue liquid and makes the remains dischargeable as waste water.

Piping 47 is branched from the piping 45 and connected to the absorber liquid chamber 16 of the reaction tank 11. Alkali agent introducing section 48 for introducing alkali agents such as limestone, slaked lime, magnesium hydroxide, caustic soda or ammonia is arranged at a middle of the piping 47. The alkali agent introducing section 48 introduces an alkali agent into part of the collection residue liquid produced as a result of solid-liquid separation to make that part utilizable again as absorber liquid 15 in the absorber liquid chamber 16.

Note that the piping 47 and the alkali agent introducing section 48 may not necessarily be arranged.

It has been proved that the above-described desulfurization apparatus in a mode of carrying out the present invention can suppress accumulation of deposits in use, achieve simplification of operation at the time of installation into the partition wall and reduce the manufacturing cost.

This application claims the benefit of priority to Japanese Patent Application No. 2017-109085 filed on Jun. 1, 2017, the contents of which are cited herein as part of this application.

REFERENCE SIGNS LIST 2 installation member; 4 pipe-shaped member; 6 elastic member;
8 partition wall; 10 gas downcomer pipe; 11 reaction tank;
12 gas to be processed introducing channel; 13 processed gas discharging port;
14 gas to be processed introducing chamber; 15 absorber liquid;
16 absorber liquid chamber; 17 processed gas discharging chamber;
19 floor plate; 21 pipe-shaped part; 22 protruding part;
22b bottom surface; 22n cutout section; 24 liquid surface;
25 communication pipe; 26 space section; 27 agitator; 28 froth layer;
31 piping; 32 industrial water supply pipe; 33 piping; 34 pump;
35 piping; 38 oxygen supply pipe; 45 piping;
46 solid-liquid separator; 47 piping; 48 alkali agent introducing section;
100 desulfurization apparatus

The invention claimed is:

1. A gas downcomer pipe to be installed into a partition wall for dividing a space inside a desulfurization apparatus for desulfurizing gas containing sulfur oxides by bringing said gas into contact with absorber liquid so as to run through the partition wall, the gas downcomer pipe comprising:
a pipe-shaped member; and
an installation member adapted for installing the pipe-shaped member into the partition wall;
the installation member comprising:
a pipe-shaped part whose inner wall is to be brought into contact with an outer wall of the pipe-shaped member; and
a protruding part arranged on an outer wall of the pipe-shaped part;
wherein:
the installation member is formed as a single molded member,
the protruding part projects in a direction perpendicular to a pipe axis of the pipe-shaped part, and
the protruding part is formed with a vertically recessed portion that is recessed in a direction of the pipe axis of the pipe-shaped part.

2. The gas downcomer pipe according to claim 1, wherein an outer diameter of a lower end of the pipe-shaped part is smaller than an outer diameter of the pipe-shaped part at a position that is the same as a position of a bottom surface of the protruding part in an axial direction of the pipe-shaped part.

3. The gas downcomer pipe according to claim 2, wherein the pipe-shaped part has an inner diameter that is constant.

4. The downcomer pipe according to claim 1, wherein
the protruding part has a bottom surface and includes a cutout section at the bottom surface; and
the cutout section is arranged along a portion of the bottom surface of the protruding part that is positioned at an outer wall-side end of the pipe-shaped part.

5. The gas downcomer pipe according to claim 1, wherein the single molded member forming the installation member is made by injection molding.

6. A gas downcomer pipe to be installed into a partition wall for dividing a space inside a desulfurization apparatus for desulfurizing gas containing sulfur oxides by bringing said gas into contact with absorber liquid so as to run through the partition wall, the gas downcomer pipe comprising:
a pipe-shaped member;
an installation member adapted for installing the pipe-shaped member into the partition wall; and
an elastic member,
the installation member comprising:
a pipe-shaped part whose inner wall is to be brought into contact with an outer wall of the pipe-shaped member via the elastic member; and
a protruding part arranged on an outer wall of the pipe-shaped part;
wherein:
the pipe-shaped part and the protruding part are fixed to each other or formed as a single member, prior to assembly with the pipe-shaped member,
the protruding part projects in a direction perpendicular to a pipe axis of the pipe-shaped part,
the protruding part is formed with a vertically recessed portion that is recessed in a direction of the pipe axis of the pipe-shaped part, and
the elastic member is disposed in the vertically recessed portion of the protruding part, so as to be positioned between the outer wall of the pipe-shaped part and an end portion of the protruding part.

* * * * *